(12) United States Patent
Torres et al.

(10) Patent No.: US 9,344,564 B2
(45) Date of Patent: May 17, 2016

(54) MSC LOGIC FOR SIP INVITE WITH IMRN

(71) Applicant: Verizon Patent and Licensing Inc., Arlington, VA (US)

(72) Inventors: Carlos J. Torres, Clifton, NJ (US); Ryan Anthony Confroy, Hillsbourough, NJ (US); James Walter DuDasko, Matawan, NJ (US); Eugene A. Carucci, Oxford, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 88 days.

(21) Appl. No.: 14/487,385

(22) Filed: Sep. 16, 2014

(65) Prior Publication Data

US 2016/0080563 A1    Mar. 17, 2016

(51) Int. Cl.
*H04M 9/00* (2006.01)
*H04M 3/436* (2006.01)
*H04M 15/00* (2006.01)

(52) U.S. Cl.
CPC ............ *H04M 3/436* (2013.01); *H04M 15/57* (2013.01)

(58) Field of Classification Search
CPC ............ H04L 65/1096; H04L 65/1069; H04L 65/1006; H04L 29/06027; H04L 65/105; H04L 65/1016; H04L 29/06224; H04L 65/1063; H04L 65/103; H04L 65/104; H04L 61/106; H04L 65/102; H04L 65/1043; H04W 36/00
USPC ................................ 455/401, 445, 3.03, 3.04
See application file for complete search history.

(56) References Cited

U.S. PATENT DOCUMENTS

| | | | |
|---|---|---|---|
| 8,369,319 B2 | 2/2013 | Buckley | |
| 8,621,004 B2 | 12/2013 | Desai et al. | |
| 2010/0177771 A1* | 7/2010 | Buckley | .............. H04L 12/66 370/352 |
| 2013/0089014 A1 | 4/2013 | Duffy et al. | |

* cited by examiner

*Primary Examiner* — Ronald Eisner

(57) ABSTRACT

A method of receiving, by a mobile switching center (MSC), a first call associated with an IP multimedia subsystem (IMS) network. The method determines whether an origination request return result (ORREQ rr) message, associated with the first received call, was previously received by the MSC. Based on the determination that the ORREQ rr was previously received, the method generates a session initiation protocol (SIP) invite message and sends the SIP invite message from the MSC.

20 Claims, 5 Drawing Sheets

MSC LOGIC FOR SIP INVITE WITH IMRN

BACKGROUND

Recently, various attempts have been made to shield a telephone subscriber's number from unwanted calls (e.g., telemarketer calls). However, because of computer controlled sequential dialing of multiple numbers (which may include both listed and restricted telephone numbers in the network) is commonly performed by telemarketers, little, or if any, protection from telemarketers may be ensured. Restricted numbers are numbers that are not assigned to any subscriber; rather, these numbers are generated by the telecommunication system and temporarily used within the network for the purpose of routing calls. As such, calls placed by the telemarketers to these restricted numbers, albeit unintentionally, may unnecessarily use network facilities. This may thus put unnecessary burden on the network. Moreover, an anti-telemarketing program, employed by a network provider, uses the calling party identification of an incoming call to determine if the call is a telemarketing call by accessing a telemarketing database. The incoming call can be identified as a telemarketing call by direct correlation with a known telemarketing number. However, if the calling party number is suppressed or if it is not listed in the telemarketing database, the telemarketing call eventually reaches the telephone numbers that are restricted.

Therefore, there is a need to efficiently filter out calls made to restricted numbers and further routing calls to the appropriate subscribers by the network provider.

DETAILED DESCRIPTION OF PREFERRED EMBODIMENTS

Figure 1:
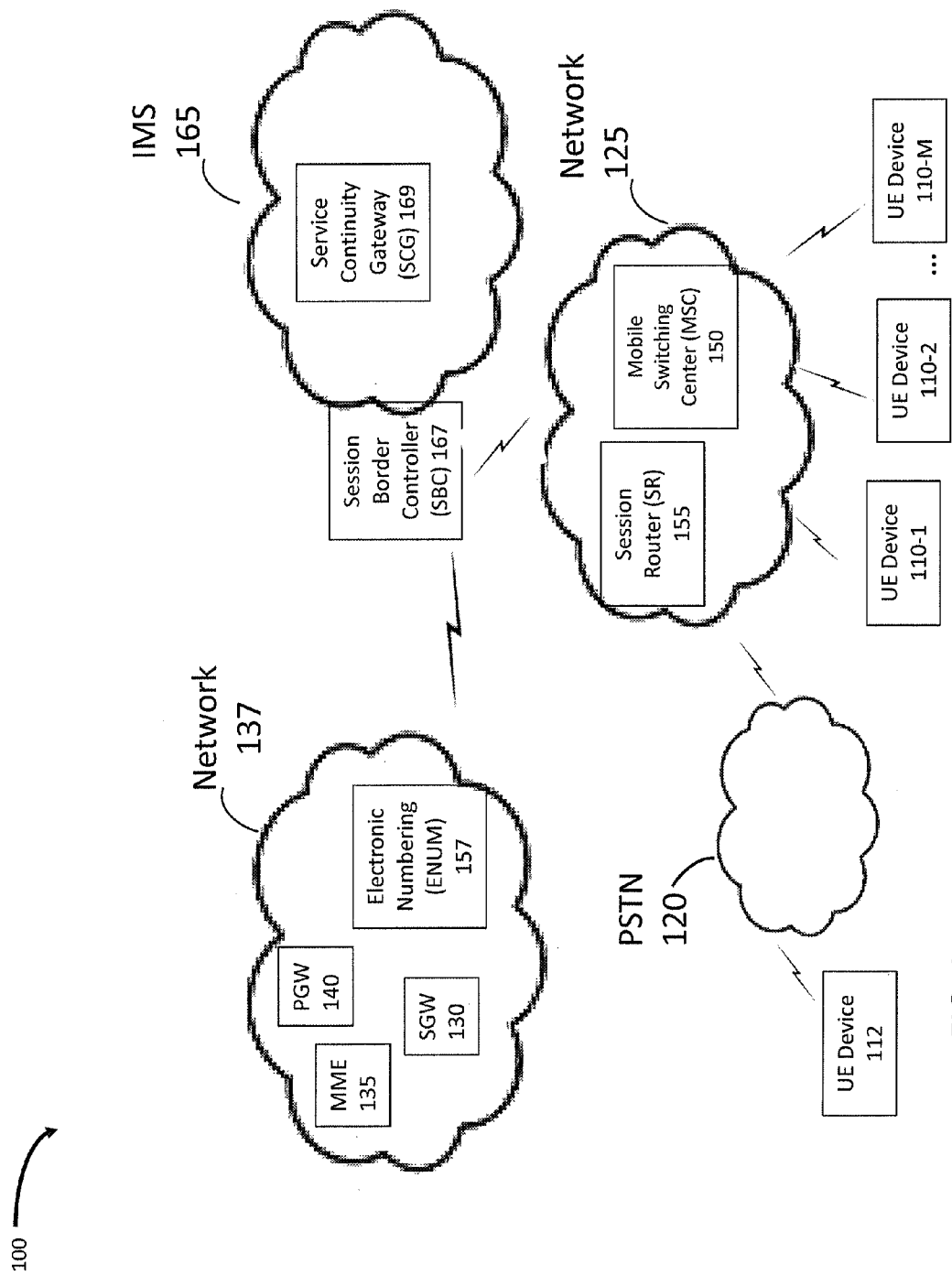
FIG. 1 is a diagram of an example environment in which systems and/or methods described herein may be implemented.

The following detailed description refers to the accompanying drawings. The same labels and/or reference numbers in different drawings may identify the same or similar elements. Also, the following detailed description does not limit the invention.

In one or more implementations, devices may be used to control the routing, connecting, redirecting, forwarding and terminating calls received for and/or from user equipment (UE) devices in a wireless network.

In the materials that follow, the term "wireless node," is intended to be broadly interpreted to include a device that wirelessly communicates with a user device. By way of example, but not limited thereto, a wireless node may correspond to an evolved Node B (eNB), a base station (BS), a base station controller (BSC), a Node B, a base transceiver station (BTS), a relay node, a repeater, a home eNB, a radio node, or a UE-gateway (UE-GW). The wireless node may support one access and/or wireless technology or multiple access and/or wireless technologies.

As used herein, the terms "telephone number", "mobile directory number (MDN)", "mobile station integrated services digital network (ISDN) number (MSISDN)", "mobile station international ISDN number" are intended to be used interchangeably.

The term "routing of a call," or "call routing" as used herein, is to be broadly interpreted to include signal and/or data flow between UE devices via multiple routers, switches and application servers. The call routing comprises routing of circuit switched voice calls, voice over Internet Protocol (VoIP) calls, voice over Long Term Evolution (VoLTE) calls, etc.

By way of example, but not limited thereto, within a Long Term Evolution (LTE) network, routing of a call may permit signal or data to flow from one UE device to a server or a group of servers through one or more wireless nodes (e.g., one or more eNBs) to serving devices without traversing higher layers of the LTE network (e.g., a serving gateway (SGW) or a packet data network (PDN) gateway (PGW)). It will be appreciated that routing of network based calls may be applicable to networks other than LTE. In this regard, the term "network," as used herein, is intended to be broadly interpreted to include a wired or wireless network (e.g., mobile network, cellular network, non-cellular network, etc.). By way of example, but not limited thereto, routing of call may be performed in a variety of network types, such as, a Global System for Mobile Communications (GSM) network, a Universal Mobile Telecommunication System (UMTS) network, a Wideband Code Division Multiple Access (WCDMA) network, Code Division Multiple Access (CDMA) that includes a circuit switched network or legacy switched signaling system (1×CS) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, and/or another type of wireless network (e.g., an ad hoc network, etc.), or other type of wired network.

Depending on the type of network, routing of a call may be facilitated by wireless nodes not specifically described herein that provide corresponding functionality. By way of example, but not limited thereto, routing of calls may be facilitated by a BS, a BSC, an eNB, a network access device, a serving GPRS support node (SGSN), etc.

Routing of calls in a network may be further facilitated by routing numbers. For example, Temporary Local Directory Numbers (TLDNs) are temporary numbers that are used, for example, in the 1×CDMA network, to forward calls to new network elements. Internet Protocol Multimedia Routable Numbers (IMRNs) are similar to TLDNs, in the sense that they are temporary numbers that may be used within the network of the carrier to allow Internet Protocol Multimedia Subsystem (IMS) network subscribers to drop-down/roam onto CDMA network of the carrier. IMRNs may reside on application servers (e.g., VoLTE service continuity gateway (SCG) servers) and may allow customer mobile originations on CDMA to be anchored in the IMS network. The SCG typically maintains a pool of IMRNs that are dynamically associated with called party numbers for routing calls toward called party. In one implementation, the pool of IMRNs is configured on a mobile switching center (MSC) of the CDMA network and stored in the MSC. The MSC consults the pool of IMRNs for various operations related to routing of a call, as described in detail below.

For example, when a call is placed for a MDN that is associated with a packet data network, such as the IMS network, the call may be routed by a circuit switch to the packet data network via different entities of the network, such as session routers, gateway servers, etc. In one implementation, a call may be placed by a VoLTE subscriber who is not in an IMS network coverage area, instead being in a CDMA network coverage area. Because the calling party is a VoLTE subscriber, the CDMA network anchors the call to the IMS network. For example, in order to route the call to the appropriate network (i.e., the IMS network), the MSC of the CDMA network may send information associated with the VoLTE call to a service continuity gateway (SCG) (e.g., a VoLTE SCG) via messages conforming to a signaling system No. 7 (SS7) protocol. The associated information may include the called party MDN (cpD) of the VoLTE subscriber and the calling party MDN (cpN), for example. The information may be sent in a SS7 message. In one example, the message may be an origination request (ORREQ) message. In another example, the message may be sent to the VoLTE SCG via another entity (e.g., home location register (HLR) or visitor location register (VLR)). The SCG may perform necessary steps to route the call to the VoLTE subscriber.

Moreover, upon receiving the associated information in the message, the VoLTE SCG server may determine that the call is from an IMS subscriber (e.g., a VoLTE subscriber) based on the calling party MDN in the ORREQ message. As a result, the SCG server may allocate an IMRN, which is the temporary routing number. The allocated IMRN may be used for future routing of the same call. Particularly, the SCG server may send back a responsive ORREQ message (that includes the IMRN) to the location register (e.g., HLR or VLR), which then transfers the message to the MSC. In one example, the responsive message may be an ORREQ return result (OR-REQ rr) message. Alternatively, the SCG may be configured to send the ORREQ rr message directly to the MSC.

The MSC may store the received ORREQ rr that includes the IMRN. Particularly, the ORREQ rr message may be used by the MSC logic in various ways to avoid network congestion that can arise due to generation of unwanted SIP invites in the network, as described at a high level, with reference to FIG. 4.

Figure 4:
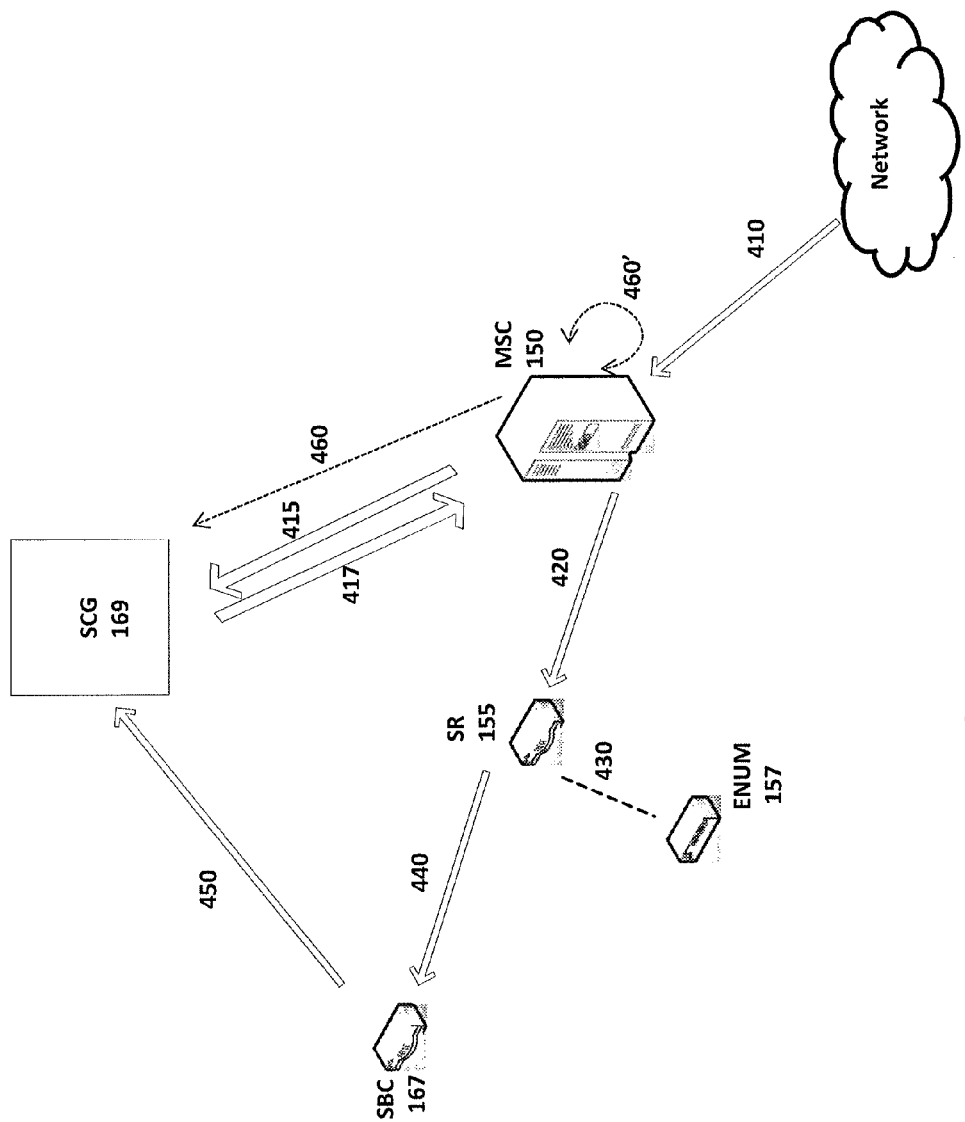
FIG. 4 is a flow diagram of another example process executed by a mobile switching center according to one or more implementations described herein.

As shown in FIG. 4, at step 410, in one exemplary implementation, an MSC 150, associated with a circuit switched network, receives, from a calling party, a call to a MDN that is assigned to a UE device (e.g., a telephone, a mobile phone, a wireless device, a VoLTE subscriber, etc.) and that is served by an IMS network. The call may be received from another communication network.

Upon receiving the call from the calling party, a wireless intelligent (WIN) trigger is activated in the MSC. In one implementation, the trigger may cause the MSC 150 to query a VLR (Visitor Location Registration) to determine the provisioned WIN Trigger. Upon receiving the response, the MSC 150 sends an Origination Request message to the SCG 169 at step 415. Based on the communication with the MSC 150, the SCG 169 allocates an IMRN and sends back a response message with the IMRN to the MSC 150 at step 417. The MSC 150 caches the received IMRN for a period of time. For example, the MSC 150 may cache the IMRN from 1 second to 20 minutes. It is contemplated that the MSC may include a configurable cache timer that may be set to specify the period of time for which an IMRN is cached.

Upon receiving the IMRN, at step 420, the MSC 150 generates a second message (e.g., a session initiation protocol (SIP) invite message) that replaced the called party number with the IMRN, and sends it toward the session router (SR) 155.

The SR 155 extracts the IMRN from the SIP invite message (i.e., the second message) and performs an Electronic Numbering (ENUM) query by consulting ENUM server 157 at step 430. The query may result in a Fully Qualified Domain Name (FQDN) for an SCG, as described in detail below. In this example, the query provides the FQDN of the SCG 169.

At step 440, the SR 155 routes the SIP invite message, based on routing logic (e.g., using the IP address of the SCG 169 obtained during the ENUM query), to a local Session Border Controller (SBC) 167. At step 450, The SBC 167 then routes the SIP invite message to the SCG 169.

Upon receipt of the SIP invite with the IMRN, the SCG 169 queries its resident memory and locates an associated ORREQ (i.e., a message that includes the called party MDN associated with the IMRN). The SCG 169 replaces the received IMRN with the called party MDN and eventually sends a new SIP invite towards the IMS network.

There may be an issue, however, when the MSC 150 receives a phone call, for example, from a Public Switched Telephone Network (PSTN) directly to an IMRN without the IMRN having been allocated by the SCG 169.

For example, the called party MDN may be an IMRN stored in the SCG 169. As described above, numbers generated by telemarketers often are not numbers of known parties but are sequentially generated from a base number. Using these algorithms, the telemarketer may unknowingly generate a sequence of IMRNs. In such a scenario, the received called party MDN is not related to any IMS subscriber, rather it is an unintentionally generated network internal number.

As described above with reference to FIG. 4, generally, upon receipt of an IMRN, the MSC 150 sends a SIP invite towards the SR 155, which ultimately reaches the SCG 169, as described at steps 420 to 450. The SCG 169 then sends a new SIP invite towards the IMS network. In a similar fashion, when an IMRN generated by the telemarketer is received by the MSC 150, the MSC 150 generates a SIP invite message in the network. In this case, however, the SCG 169 fails to find an associated ORREQ message (i.e., there is no corresponding called party number for the called IMRN). As such, the SCG 169 indicates an Anchor Failure (i.e., the SCG cannot anchor the call). Hence, when a call is placed by a telemarketer directly to an IMRN at step 410, unwanted SIP invite messages are generated by the MSC 150 in the network. These SIP invite messages are routed via steps 420 through 450 to the SCG 169.

Therefore, when a telemarketer calls an IMRN, both the generation and the routing of the SIP invite messages at steps 420 through 450 are unnecessary and cause undesirable network congestion.

Because IMRNs are regular 10 digit telephone numbers allocated to the SCGs as ranges of consecutive numbers, the above mentioned scenario may occur when telemarketers dial ranges of telephone numbers and eventually end up dialing a sequence of IMRNs. As described above, it may be difficult for network operators to control the telemarketers, in particular to stop them from calling restricted numbers, such as IMRNs.

This problem can be avoided by instituting logic at the MSC that, when an IMRN is received, first checks for an associated ORREQ return result (rr) prior to transmitting any SIP invite messages. For example, at step 460, the MSC 150 may query the SCG 169 to determine if the corresponding ORREQ rr was previously received. The MSC 150, in another implementation, at step 460', may query its own database or memory to determine if it has previously received the corresponding ORREQ rr message.

In yet another implementation, the MSC 150 may have logic determine whether an ORREQ message was sent to the SCG 169 associated with a call. In this example, the MSC 150 may or may not receive a response message back from the SCG 169. As such, the ORREQ message may not be as relevant as an ORREQ rr message as there is no IMRN associated with the ORREQ message.

If it is determined that the MSC 150 previously did not receive an ORREQ rr for the calling party MDN, the MSC 150 does not send a SIP invite to other entities of the network. As such, routing of the SIP invite message from steps 420 through 450 may be avoided.

Hence, the MSC 150 only sends a SIP invite in response to a received IMRN if an associated ORREQ rr has been received. This suppresses unnecessary SIP invite messages and also keeps from generating indications of Anchoring Failures at the SCG169.

FIG. 1 is a diagram showing an overview of an example implementation. As shown in FIG. 1, a network environment 100 may include multiple UE devices 110-1, 110-2, . . . , 110-M (where M≥1) (referred to collectively herein as UE devices 110 and individually as UE device 110). In this example, the UE devices 110 transmit signals and data to the CDMA network 125 over-the-air via a number of base stations (not shown). This message may be routed to the IMS network 165 via the LTE network 125, for example, when a user of the UE device 110 is a VoLTE subscriber, but is only under the CDMA network coverage.

UE device 110 may include any computation or communication device, such as a wireless mobile communication device that is capable of communicating with base station and/or a server. Examples of the UE device 110 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. UE device 110 may send traffic to and/or receive traffic from MSC 150. The UE devices are programmed with applications (Apps) that access content from the network. An example UE device 110 may have multiple Apps running at a given time and, thus, may access multiple content items (e.g., multiple videos, multiple audios, text, etc.) at the same time. In an exemplary implementation, UE devices 110 may be configured to communicate over IMS network 165, CDMA network 125 and LTE network 137.

In one example, another UE device 112 may send signals and data to the CDMA network 125 via PSTN 120. In this example, the UE device 112 may be associated with a telemarketer. UE device 112 may include a digital or an analog telephone.

With further reference to FIG. 1, the example network environment 100 may include an evolved packet system (EPS) that includes a LTE network and/or an evolved packet core (EPC) 137 which operates based on a third generation partnership project (3GPP) wireless communication standard. The LTE network may be a radio access network (RAN) including one or more small base stations that take the form of eNBs. The LTE network 137 may include SGW 130, mobile management entity (MME) 135, ENUM server 157 and/or PGW 140 that enable UE devices 110 to communicate with the IMS network 165.

Network environment 100 may include a circuit switched network, such as a network that supports mobile telecommunications standards that use CDMA. In one exemplary implementation, the circuit switched network is a CDMA network 137 that includes the legacy switched signaling system (1×CS) network. In another example, a GSM network in addition to or instead of CDMA network 125 may be implemented in the example network environment 100.

PSTN 120 may include a network of multiple public circuit-switched telephone networks. For example, PSTN 120 may be an aggregate of various circuit-switched telephone networks that are operated by national, regional, or local telephony operators. PSTN 120 may include fixed-line analog telephone systems, digital telephone systems, and mobile and fixed telephone lines.

The MSC 150 may be included in the CDMA network 125 that controls the setting up of calls by controlling how, where, and when the call is routed as described in detail with reference to FIG. 3A. The MSC 150 may communicate with different application servers and routers that are within the same network or in different networks. The communication between the application servers and the MSC 150 may take place via an evolved packet core (EPC) network or, in one example, the MSC may communicate with the application servers directly, bypassing the EPC network.

MSC 150 may include one or more server devices, or other types of computation or communication devices, that gather, process, search, and/or provide information in a manner described herein. In one exemplary implementation, MSC 150 may include a primary service delivery node, and may be responsible for handling voice calls and other services (e.g., conference calls, circuit switched data, etc.). MSC 150 may set up and release an end-to-end connection, and may handle mobility and hand-over requirements during a communication (e.g., a call). In one example, MSC 150 may have logic to determine if it has previously received an ORREQ rr message, from another entity in the network, such as the SCG 169, associated with a call (e.g., a calling party MDN, called party MDN and/or an IMRN). In another example, MSC 150 may have logic to determine if it has previously sent an ORREQ message to the SCG 169, associated with the call. In this example, however, the MSC 150 may or may not have received a response message back from the SCG 169.

Based on the determination, MSC 150 may be further configured to either send or inhibit a SIP invite message to the SR 155. In one example, MSC 150 may be configured to cache a received or sent origination message (i.e., ORREQ rr or ORREQ) as described above. In another implementation, MSC 150 may be configured to translate an IMRN, as described in detail with reference to FIG. 3A.

SR 155 may include one or more data transfer devices, such as a gateway, a router, a switch, a firewall, a NIC, a hub, a bridge, a proxy server, or some other type of device that processes and/or transfers data. In one exemplary implementation, SR 155 may perform internetwork signaling and may determine a location of a SCG server for a MDN or an IMRN by querying ENUM server 157. SR 155 may be implemented as part of the CDMA network 125, or LTE network 137.

Electronic Numbering (ENUM) server 157 may include one or more server devices, or other types of computation or communication devices, that gather, process, search, and/or provide information in a manner described herein. In one exemplary implementation, ENUM server 157 may provide a suite of protocols to map a MDN (or an IMRN) assigned to user device 110 to an address (e.g., an IP address or FQDN). In an exemplary implementation, ENUM server 157 may be part of the CDMA network 125 instead of LTE network 137.

IMS network 165 may include an architectural framework or network (e.g., a telecommunications network) that provides Internet protocol (IP) multimedia services. In one example, IMS network 165 may include SCG 169.

SBC 167 may include one or more server devices, or other types of computation or communication devices, that gather, process, search, and/or provide information in a manner described herein. In one exemplary implementation, SBC 167 may exert control over signaling and media streams involved in setting up, conducting, and tearing down telephone calls or other interactive media communications. SBC 167 may support IPv4 and IPv6 interworking and topology hiding functions. SBC may be in between the LTE network 137, IMS network 165, CDMA network 125 and/or PSTN 120.

SCG application server 169 may include one or more server devices, or other types of computation or communication devices that are capable of supporting session continuity (e.g., service that permits users to move voice calls between a circuit switched domain and IMS network, connected through different IP-connectivity access networks (IP-CANs)). In one implementation, SCG 169 may be configured to generate, allocate and/or store temporary telephone numbers such as IMRNs. IMRNs may be allocated sequentially. For example, SCG 169 may allocate twenty 10-digit sequential IMRNs, where each of the consecutive IMRNs varies by a single number. In addition, SCG 169 may store called party MDNs. SCG 169 may be further configured to communicate with the MSC 150. SCG 169 may be included in the IMS network 165, in one implementation or it may be in between the LTE network 137 and IMS network 165.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations associated with the LTE network, and may send the aggregated traffic to the MSC 150 (e.g., via PGW 140) and/or other network devices associated with the EPC. SGW 130 may also receive traffic from the other network devices and/or may send the received traffic to UE device 110 via base station. SGW 130 may perform operations associated with handing-off UE devices 110 from and/or to other base stations in the LTE network.

MME 135 may include one or more computation or communication devices that gather, process, search, store, and/or provide information in a manner described herein. For example, MME 135 may perform operations associated with handing off UE device 110, from one base station to another. The MME may also interface with the authorization and accounting/home subscriber server (AAA/HSS) (not shown) to provide authentication, authorization and accounting services for the LTE network 137.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs, and may send the aggregated traffic to MSC 150, to other network devices. In another example implementation, PGW 140 may receive traffic from MSC 150, and may send the traffic toward other servers and/or one of the UE devices 110 via SGW 130.

The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Figure 2:
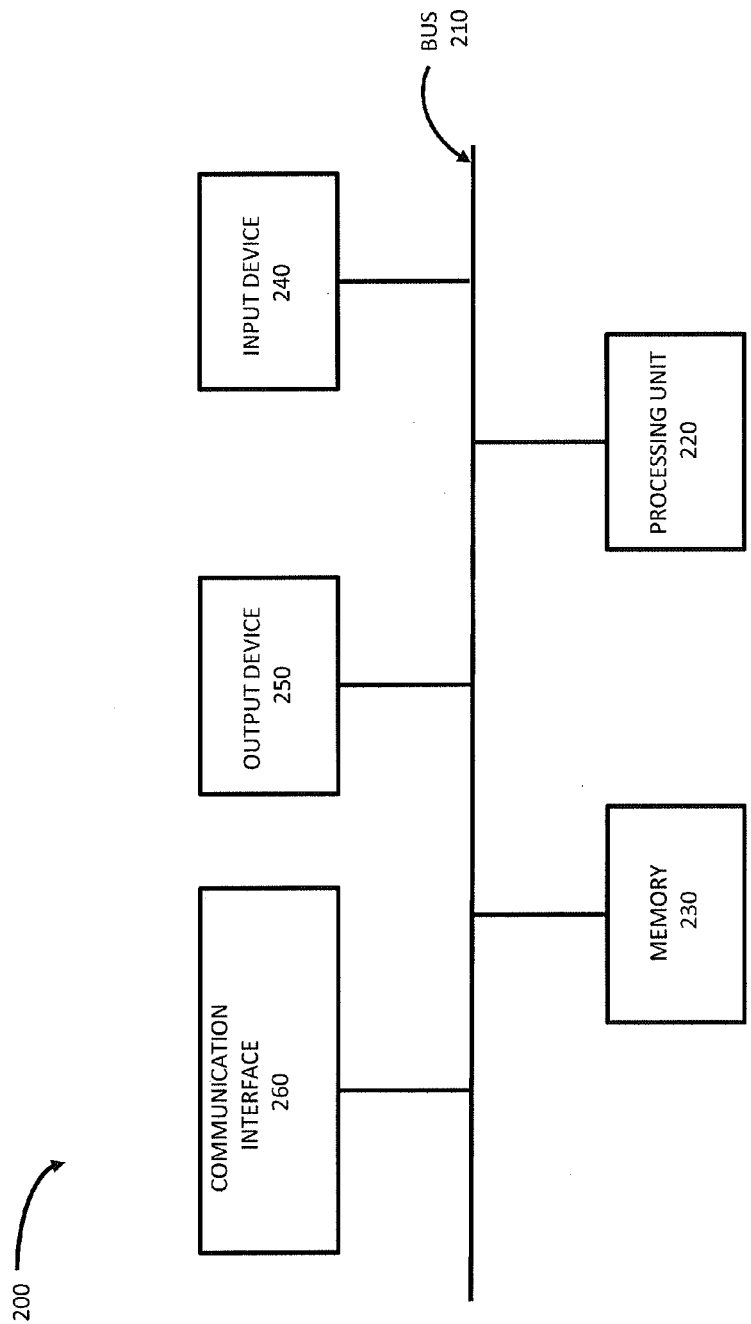
FIG. 2 is a block diagram of example components of a device that may be utilized in the environment of FIG. 1.

FIG. 2 is a diagram of example components of a device 200 according to one or more implementations described herein. As depicted, device 200 may include bus 210, processor 220, memory 230, input device 240, output device 250 and communication interface 260. Also, if the device 200 is a server, such as SCG 169, ENUM server 157, it may not include input 240. However, in other implementations, device 200 may include fewer components, additional components, different components, or differently arranged components than those illustrated in FIG. 2.

In certain implementations, a portion or all of device 200 may correspond to one or more of the devices depicted in FIG. 1. For example, device 200 may correspond to UE devices 110 and 112, SGW 130, MME 135, PGW 140, SR 155, ENUM server 157, SCG 169, SBC 167 or MSC 150. Additionally, each of UE devices 110 and 112, SGW 130, PGW 140, SR 155, ENUM server 157, SCG 169, SBC 167, MSC 150, may include one or more devices 200 or one or more components of device 200 and multiple ones of the SGW 130, PGW 140, SR 155, ENUM server 157, SCG 169, SBC 167, MSC 150 may be implemented in a single one of the devices 200.

As depicted, device 200 may include bus 210, processor 220, memory 230, input device 240, output device 250 and communication interface 260. However, in other implementations, device 200 may include fewer components, additional components, different components, or differently arranged components than those illustrated in FIG. 2.

Bus 210 may include one or more component subsystems and/or communication paths that enable communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 220 may control the overall operation, or a portion thereof, of device 200, based on, for example, an operating system, and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. The memory 230 may include computer-readable medium, defined as a non-transitory memory device. A memory device may include space within a single physical memory device or be spread across multiple physical memory devices.

Input device 240 may include one or more components that permit a user to input information into device 200. For example, input device 240 may include a touch-screen, keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type optical, wireless or wired interface. Communication interface 230 may also include an antenna (or a set of antennas) that permit wireless communication, such as the transmission and reception of radio frequency (RF) signals in accordance with the applicable standard for wireless communications with base stations.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3A:
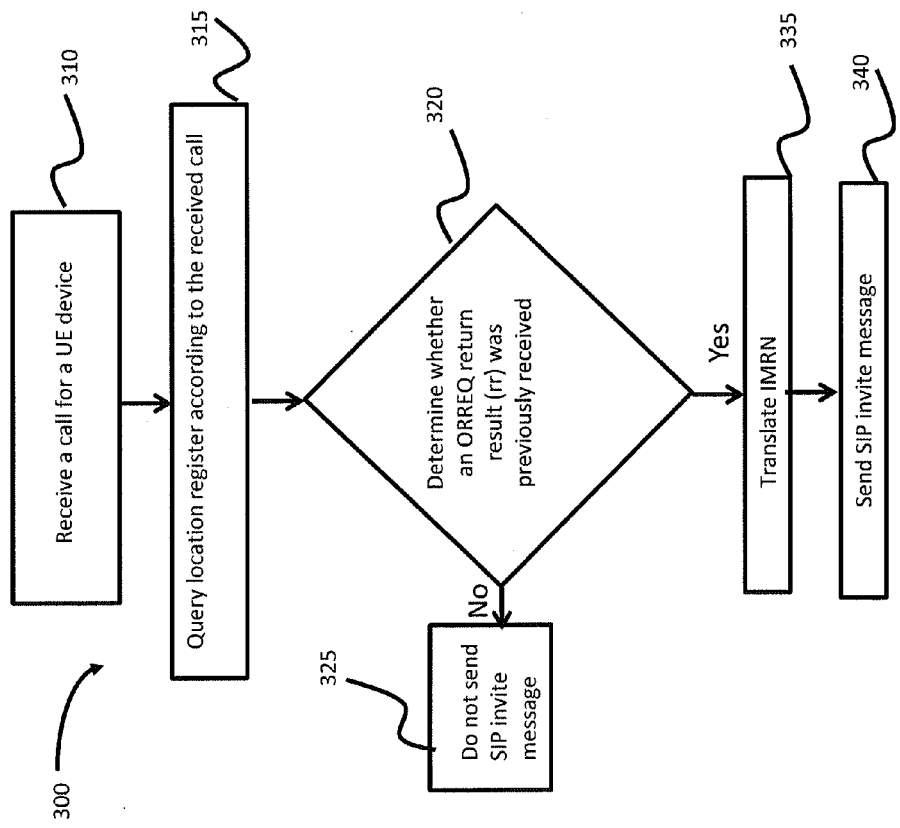
FIG. 3A is a flow-chart diagram of an example process executed by a mobile switching center for routing a call according to one or more implementations described herein.
Figure 3B:
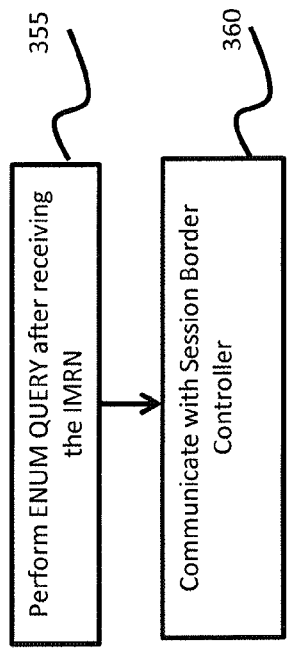
FIG. 3B is a flow-chart diagram of details of another example process executed by a session router for routing a call according to one or more implementations described herein.
Figure 3C:
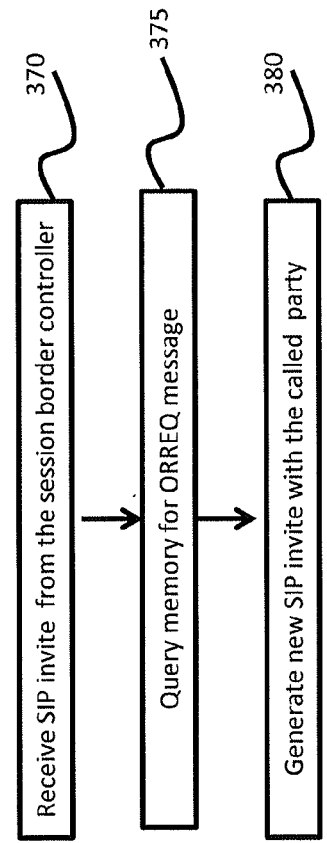
FIG. 3C is a flow-chart diagram of an example process executed by a service continuity gateway for routing a call according to one or more implementations described herein.

FIGS. 3A-3C are flow charts of an exemplary process 300 for routing a MDN associated with an IMS network according to implementations described herein. In one implementation, process 300 may be performed by MSC 150, SR 155, SBC 167 and SCG 169. In another implementation, some or all of process 300 may be performed by another device or group of devices, including or excluding MSC 150, SR 155, SBC 167 and SCG 169.

As shown in FIG. 3A, process 300 may include at least receiving, by a MSC, a call from a UE device associated with a MDN (block 310), determining, by the MSC whether a message was previously received based on the received call (block 320) and either generating or inhibiting SIP invite messages based on the determination (block 325 or block 340).

For example, in implementations described above in connection with FIG. 1, a call may be received from UE device 110 that includes a cpD MDN and a cpN MDN. The cpD MDN may be associated with IMS network 165. In one implementation, the cpD MDN may be an IMRN received from the UE device 112 of a telemarketer via the PSTN 120 (block 310).

The MSC 150, upon receiving the call, queries the HLR or VLR to determine if the calling party is a VoLTE subscriber based on the cpN MDN. The query may be based on a WIN trigger that gets activated upon receiving the call. Based on the determination, MSC 150 may route the call accordingly. In one example, if the MSC 150 determines that the calling party is a VoLTE subscriber, the MSC may route the call to the appropriate VoLTE SCG, for example SCG 169 (block 315).

At block 320, the MSC 150 determines whether an ORREQ rr message has been previously received from the SCG 169. For example, as described above, the message may have been received by the MSC 150 during the initial setup of the call. The MSC 150 has logic, for example, in the processor of the MSC 150 to perform the determination. The determination includes querying for a cached ORREQ rr messages, for example, in the memory of MSC 150. In one example, the cached ORREQ rr message includes an IMRN associated with the cpN MDN. As such, the query may further include searching for the associated IMRN.

In another example, the determination includes querying the SCG 169 to determine whether the SCG 169 has previously sent an ORREQ rr message to the MSC 150. The query may be sent to a Signal Transcript Point (STP) (not shown), which then routes the query to the SCG. The SCG 169 may respond to the query with another message (e.g., with a response message) notifying the MSC 150.

If the received cpD MDN is an IMRN that is received from an external caller (e.g., a telemarketer), the MSC 150 determines that an ORREQ rr message was not previously received by the MSC 150. In this case, the MSC 150 terminates any further communication for the called IMRN. As such, at block 325, the MSC 150 inhibits the generation of any SIP invite message.

In an exemplary implementation, the MSC 150 may be configured to monitor sequential dialing to a pool of IMRNs that are stored in the SCG 169. In one example, the MSC 150 may include a counter that triggers a response when the sequential dialing reaches a threshold number. For example, the pool of IMRNs may have 100 sequential IMRNs and the counter triggers once the fifth IMRN is dialed. If the MSC 150 determines that the threshold is reached, the MSC 150 may be further configured to set a flag and notify the network administrator of the issue. The flag may be set once the counter reaches the threshold number. In addition to the counter, MSC 150 may include a timer for determining whether the sequential dialing counter has reached the threshold number in a predetermined amount of time. The predetermined amount of time for the timer may be set or reset in the MSC 150 by the network administrator. For example, the counter may set the flag if the fifth IMRN is dialed within ten minutes of the first IMRN being dialed. The counter may not trigger, however, if the fifth IMRN is dialed beyond the ten minute limit (e.g., the fifth IMRN is dialed four hours after the first IMRN has been dialed). Yet in another implementation, MSC 150 may include only the counter for monitoring the sequential dialing to the pool of IMRNs. In such an implementation, the monitoring of the sequential dialing may not be limited by time. It is further contemplated that the MSC 150 may monitor non-sequential dialing to the pool of IMRNs. For example, one or more calls may be randomly placed to the pool of IMRNs in a predetermined amount of time, by a legitimate subscriber of the network carrier by mistake. In this example, the flag may still be set even though the number of random calls may not reach the threshold number.

Moreover, the flag may be an error message which indicates that sequential calls (or non-sequential calls) are made to the pool of IMRNs. The error message may also include the calling party number (e.g., the number of the telemarketer) and may be sent to the network administrator In addition to suppressing the generation of the SIP invite message, the MSC 150 may also send a message notifying the caller that the call cannot be connected because an IMRN number has been dialed, or may block the caller from making future calls until the network system administrator approves the caller. It is contemplated that, the calling party number may be unblocked by MSC 150, if the caller (e.g., the legitimate subscriber) notifies the network administrator that the calls to the pool of IMRNs were placed by mistake. Alternatively, any lack of notification from the calling party, or repeated calling by the calling party (e.g., a telemarketer) despite the notification message being sent to the caller, may result in the calling party's number in the MSC 150 being barred by the network administrator.

Alternatively, at block 320, the MSC 150 may determine that an ORREQ rr message has been previously received from the SCG 169. The message may have been received by the MSC 150 at an earlier time, for example, during an initial setup of the call, as described above.

At block 335, the MSC 150 may be configured to translate the IMRN. For example, translation of the IMRN may include identifying the IMRN and/or initiating the generation of a SIP invite message towards an IMS network (e.g., IMS 165) via a trunk group. In one implementation, the trunk group may be an IP trunk group that interconnects different network devices, such as the SR 155 using Internet Protocol. The MSC 150 routes the SIP invite message to the SR 155 that includes the IMRN (block 340).

In one implementation, the SR 155 may be deployed between the network 137 and the network 125. Further, as described in FIG. 3B, the SR 155, upon receiving the SIP invite message with the IMRN, may query the ENUM 157 (block 355). The query may result in a FQDN query for an SCG.

The ENUM server 157 may maintain a database that includes a list of IMRNs and the corresponding addresses of the SCGs (i.e., that each IMRN belongs to). Upon receiving the query, ENUM server 157 may map the IMRN to the address of the SCG (e.g., SCG 169) and provide the address to the SR 155.

At block 360, the SR 155, in response to the query, may receive the address of the SCG for the IMRN. In one example, the SR 155 may route the SIP invite message to the SCG 169 via SBC 167.

SBC 167, upon receiving the SIP invite message that includes the IMRN, may further use routing logic (e.g., logic found in the SIP-uniform resource identifier (URI)) to route the SIP invite message to the SCG 169.

As further illustrated, in FIG. 3C, at block 370, the SCG 169 may receive the SIP invite message from the SBC 167. At block 375, SCG 169 may perform a query for a called party number. For example, the called party number may be included in a message (e.g., an ORREQ message). In one implementation, SCG 169 may retrieve the IMRN, from the received SIP invite message, and match the IMRN with the associated called party MDN that is stored in the memory of the SCG 169. At block 380, SCG 169 may generate a new SIP invite message. For example, the generation may include modification of the received SIP invite message by replacing the IMRN with the associated called party MDN and sending the new SIP invite towards IMS 165. In such an implementation, the SCG 169 may not be included in the IMS 165.

It is contemplated that the ORREQ rr message may be deleted by MSC 150 upon successfully facilitating the routing of the SIP invite message to the appropriate entity in the network. For example, after a call establishment and upon a termination of the call by either the calling or the called party, the ORREQ rr message may be erased from the memory of IMS 150.

It is noted that example programs shown in FIGS. 3A-3C may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain implementations may involve a component that performs one or more functions. These components may include hardware, such as an ASIC or a FPGA, or a combination of hardware and software.

Aspects of the methods of providing restoration-on-demand service described above may be implemented in hardware or software. Program aspects of the technology may be thought of as "products" or "articles of manufacture" typically in the form of executable code and/or associated data that is carried on or embodied in non-transitory machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from the memory of one computer or processor into another. As used herein, unless restricted to non-transitory, tangible "storage" media, terms such as computer or machine "readable medium" refer to any such medium that participates in providing instructions to a processor for execution.

Non-volatile storage media include, for example, optical or magnetic disks, such as any of the storage devices in any computer(s) or the like, such as may be used to implement the functions described above. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, an EPROM, a FLASH-EPROM, any other memory chip or cartridge transporting data or instructions, or any other medium from which a computer can read programming code and/or data. Many of these forms of computer readable media may be involved in carrying one or more sequences of one or more instructions to a processor for execution.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a mobile switching center (MSC), a first call that includes a mobile directory number (MDN), the MDN being associated with an IP multimedia subsystem (IMS) network;
determining, at the MSC, whether an origination request return result (ORREQ rr) message, associated with the first received call, was received by the MSC, before the first call was received by the MSC;
generating, at the MSC, a session initiation protocol (SIP) invite message, associated with the first call, upon determining that the ORREQ rr was received, before the first call was received by the MSC; and
sending the SIP invite message from the MSC.

2. The method of claim 1, further comprising:
receiving a second call that includes an Internet Protocol Multimedia Routable Number (IMRN);
determining that no other ORREQ rr message for the second call was previously received; and
inhibiting the generating of another SIP invite message, associated with the second call, upon determining that no other ORREQ rr message for the second call was previously received.

3. The method of claim 2, wherein the determining that the other ORREQ rr message was not previously received comprises querying a database within the MSC for the other ORREQ rr message.

4. The method of claim 2, further comprising:
determining that a particular caller has dialed a threshold number of IMRNs, including the IMRN of the second call; and
sending a notification to at least one of a system administrator or the particular caller in response to determining that the particular caller has dialed the threshold number of IMRNs.

5. The method of claim 2, further comprising:
determining that a particular caller has dialed a threshold number of IMRNs, including the second call; and
blocking further calls from the particular caller of the second call in response to determining that the particular caller has dialed the threshold number of IMRNs.

6. The method of claim 2, further comprising:
determining that a particular caller has sequentially dialed a threshold number of IMRNs, including the second call, in a predetermined amount of time, and sending a notification message to at least one of a system administrator or to the particular caller in response to determining that the particular caller has sequentially dialed the threshold number of IMRNs in the predetermined amount of time.

7. The method of claim 2, further comprising:
determining that a particular caller has randomly dialed a number of IMRNs, including the second call, in a predetermined amount of time, and sending a notification message to at least one of a system administrator or to the particular caller in response to determining that the particular caller has randomly dialed the number of IMRNs in the predetermined amount of time.

8. The method of claim 2, further comprising determining whether an origination request (ORREQ) message associated with the second call was sent to another server and inhibiting the generation of the other SIP invite message upon determining that the ORREQ message for the second call was not previously sent to the other server.

9. The method of claim 1, wherein the determining that the ORREQ rr message was previously received comprises locating, within the MSC, an Internet Protocol Multimedia Routable Number (IMRN) associated with the MDN of the first received call, and translating the located IMRN to determine a session router (SR) from a group of session routers.

10. The method of claim 9, wherein:
generating the SIP invite message comprises embedding the IMRN in the SIP invite message prior to sending the SIP invite message to the SR; and
sending the SIP invite message from the MSC comprises sending the SIP invite message to the SR.

11. The method of claim 1, further comprising caching the received ORREQ rr message for a predetermined amount of time.

12. A mobile switching center (MSC), comprising:
a processor;
a network interface coupled to the processor, the network interface enabling network access to a user equipment (UE) device;
a memory coupled to the processor; and
a program stored in the memory, wherein the program, when executed by the processor, causes the MSC server to:

receive, by the MSC, a first call that includes a mobile directory number (MDN), the MDN being associated with an IP multimedia subsystem (IMS) network from the UE device;

determine, at the MSC, whether an origination request return result (ORREQ rr) message associated with the first received call was received by the MSC, before the first call was received by the MSC;

generate, at the MSC, a session initiation protocol (SIP) invite message associated with the first call, upon determination that the ORREQ rr message was received, before the first call was received by the MSC; and send the SIP invite message by the MSC.

13. The MSC of claim 12, further comprises a function to receive a second call that includes an Internet Protocol Multimedia Routable Number (IMRN) and to determine that no other ORREQ rr message for the second call was previously received and further comprises a function to inhibit the generation of another SIP invite message, associated with the second call, upon determination that no other ORREQ rr message for the second call was previously received.

14. The MSC of claim 13, wherein the function to determine that the other ORREQ rr message was not previously received from the other server further comprises a function to query the memory within the MSC for the other ORREQ rr message.

15. The MSC of claim 12, wherein the function to generate the SIP invite message further comprises a function to include an Internet Protocol Multimedia Subsystem routing number (IMRN) in the SIP invite message prior to sending the SIP invite message.

16. The MSC of claim 12, further comprises a function to locate an Internet Protocol Multimedia Subsystem routing number (IMRN) associated with the ORREQ rr message and further comprises a function to translate the located IMRN to determine an appropriate session router (SR) from a group of session routers.

17. A method comprising:

receiving, by a mobile switching center (MSC), a first call that includes a mobile directory number (MDN), the MDN being associated with Internet protocol multimedia subsystem (IMS) network for a user equipment (UE) device;

determining, at the MSC, whether a first message associated with the received first call was received from another server, before the first call was received by the MSC;

generating, at the MSC, a session initiation protocol (SIP) invite message, associated with the first call, upon determining that the first message was received by the MSC, before the first call was received by the MSC; and sending the SIP invite message.

18. The method of claim 17, further comprising receiving a second call including an Internet Protocol Multimedia Routable Number (IMRN), and determining that a second message associated with the IMRN was not previously received by the MSC from the server, inhibiting generation of another SIP invite message.

19. The method of claim 18, wherein the determining that the second message was not previously received comprises querying a database within the MSC for the second message.

20. The method of claim 17, wherein the generating the SIP invite message further comprises embedding an Internet Protocol Multimedia Routable Number (IMRN) in the SIP invite message prior to routing the SIP invite message towards the IMS network.

* * * * *